United States Patent [19]

Brown et al.

[11] 4,138,133
[45] Feb. 6, 1979

[54] VEHICLE WEIGHT TRANSFER MECHANISM

[75] Inventors: Leslie A. Brown, Tenbury Well; Harry W. Norton, Ludlow, both of England

[73] Assignee: F. W. McConnel Limited, Ludlow, England

[21] Appl. No.: 788,974

[22] Filed: Apr. 19, 1977

[51] Int. Cl.² ........................................ B60D 1/00
[52] U.S. Cl. ............................ 280/405 B; 280/496
[58] Field of Search ........... 280/405 R, 405 B, 446 A, 280/406 A, 402, 456 A, 474, 496, 763; 254/86 R, 86 H, 45; 172/274; 214/131 A

[56] References Cited

U.S. PATENT DOCUMENTS

| 2,440,550 | 4/1948 | Martin | 280/496 X |
| 2,449,315 | 9/1948 | Partin | 280/496 X |
| 2,931,525 | 4/1960 | Davis | 214/132 |
| 3,480,294 | 11/1969 | Lichti | 280/405 R |

Primary Examiner—Joseph F. Peters, Jr.
Assistant Examiner—R. Schrecengost
Attorney, Agent, or Firm—Staas & Halsey

[57] ABSTRACT

A weight transfer mechanism for a machine to be towed by a towing vehicle, said mechanism having a lifting device and a member in use, coupled to the lifting device and mounted for vertical pivotal movement with respect to the vehicle. Means are included to provide an abutment between the member and a relatively fixed location associated with the vehicle so that when the machine is lifted, such abutment prevents relative lifting between the machine and the vehicle.

11 Claims, 4 Drawing Figures

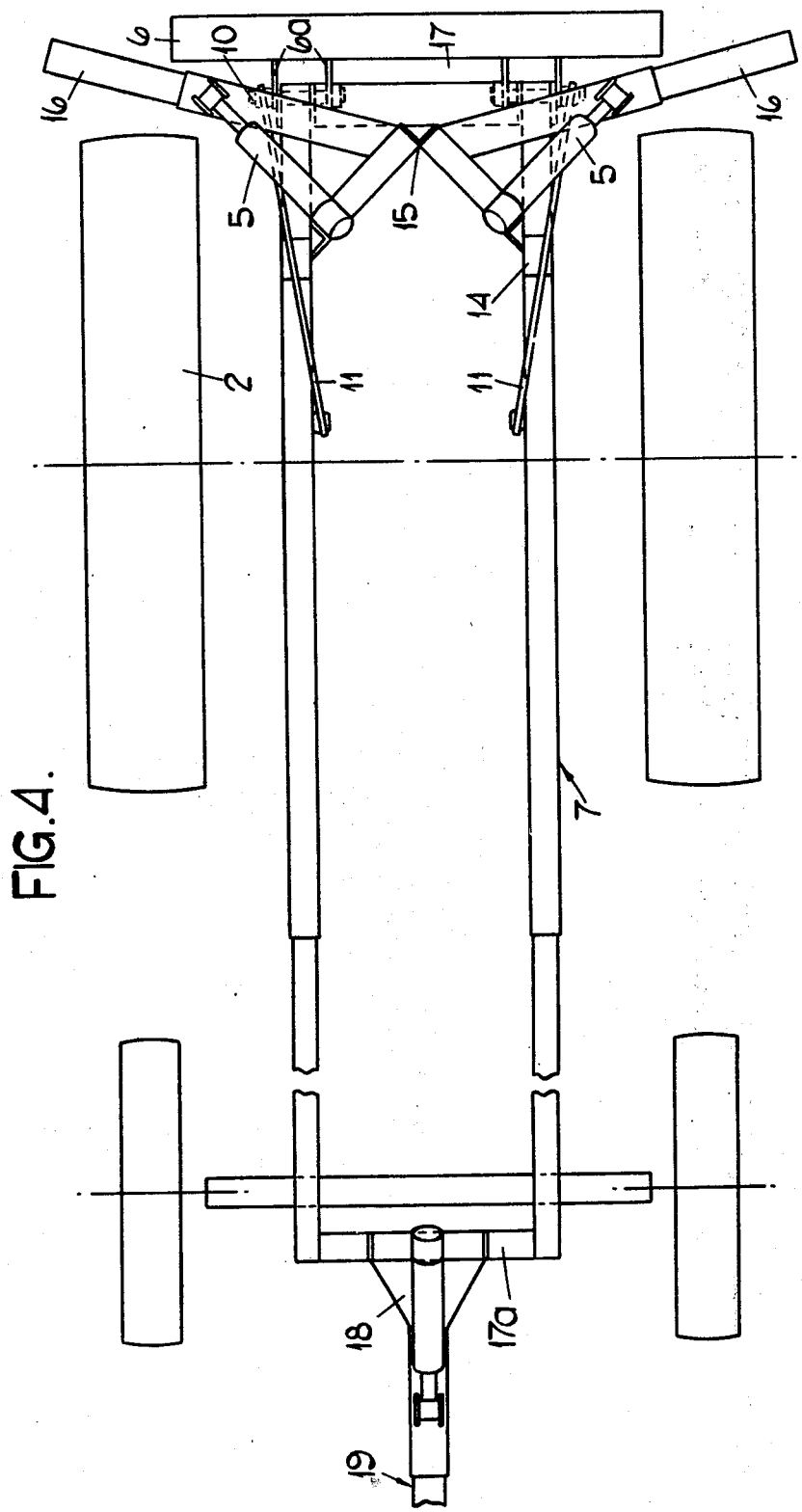

VEHICLE WEIGHT TRANSFER MECHANISM

This invention relates to a weight transfer mechanism for use with a combination of a machine such as a digger, and a towing vehicle, such as a tractor. The invention is particularly applicable to such an arrangement in which lifting means on the machine or vehicle are operated to lift the machine relative to the vehicle.

With such an arrangement of towing vehicle and machine, a danger has been found to exist due to the possibility of an operative on the machine, who usually has his back to the vehicle, raising the machine relative to the vehicle and being crushed against an adjacent part of the vehicle, such as a cab.

An object of the invention is to provide a weight transfer mechanism in which the aforesaid danger is minimised or avoided.

According to the invention, there is provided, in or for a machine to be towed by a towing vehicle, a weight transfer mechanism comprising a lifting device, a weight transfer member adapted to be coupled to the lifting device and to be supported for generally vertical pivotal movement with respect to the vehicle, and means for providing an abutment between said member and abutment means connected to or forming part of the vehicle, the arrangement being such that, when the machine is connected to the member and the lifting device is operated to lift the machine, the member and abutment means come into engagement to prevent relative lifting between the machine and vehicle.

When the invention is applied to a vehicle having a three-point linkage, it is very convenient to use at least one, and usually both, of the lower generally horizontal links of this linkage as the abutment means so that the lifting force is applied to the vehicle through the link or links.

The weight transfer member is preferably supported on an axle of the vehicle, usually at the front thereof, and extends to a location adjacent to and conveniently beyond an axle of the opposite end of the vehicle for coupling to the lifting device. This arrangement enables a lifting means associated with the machine to be used as the lifting device, which means usually comprises one or more rams.

The invention will now be described, by way of example, with reference to the accompanying drawings in which:

FIG. 4 is a diagrammatic plan view of a further alternative form of the mechanism of the invention.

Figure 1:
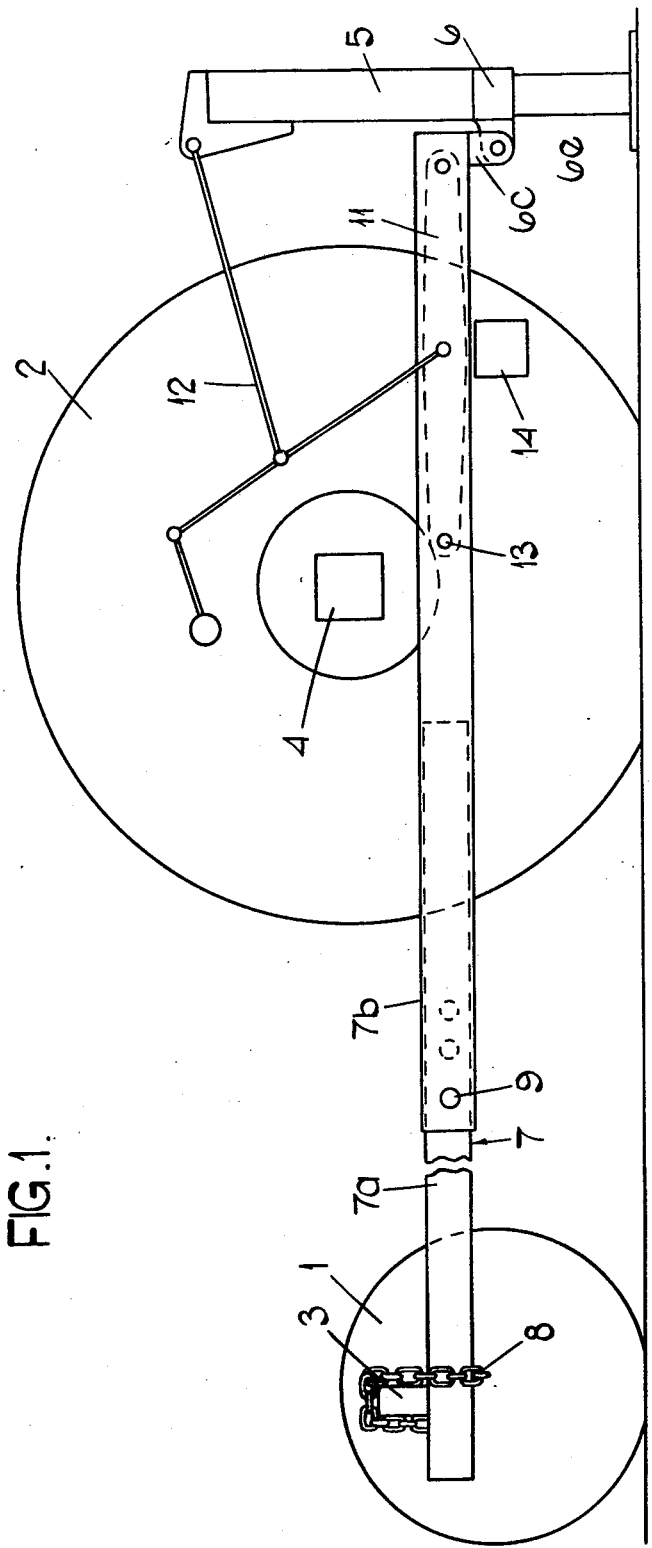
FIG. 1 is a diagrammatic side view of one form of weight transfer mechanism of the invention installed in a vehicle.
Figure 2:
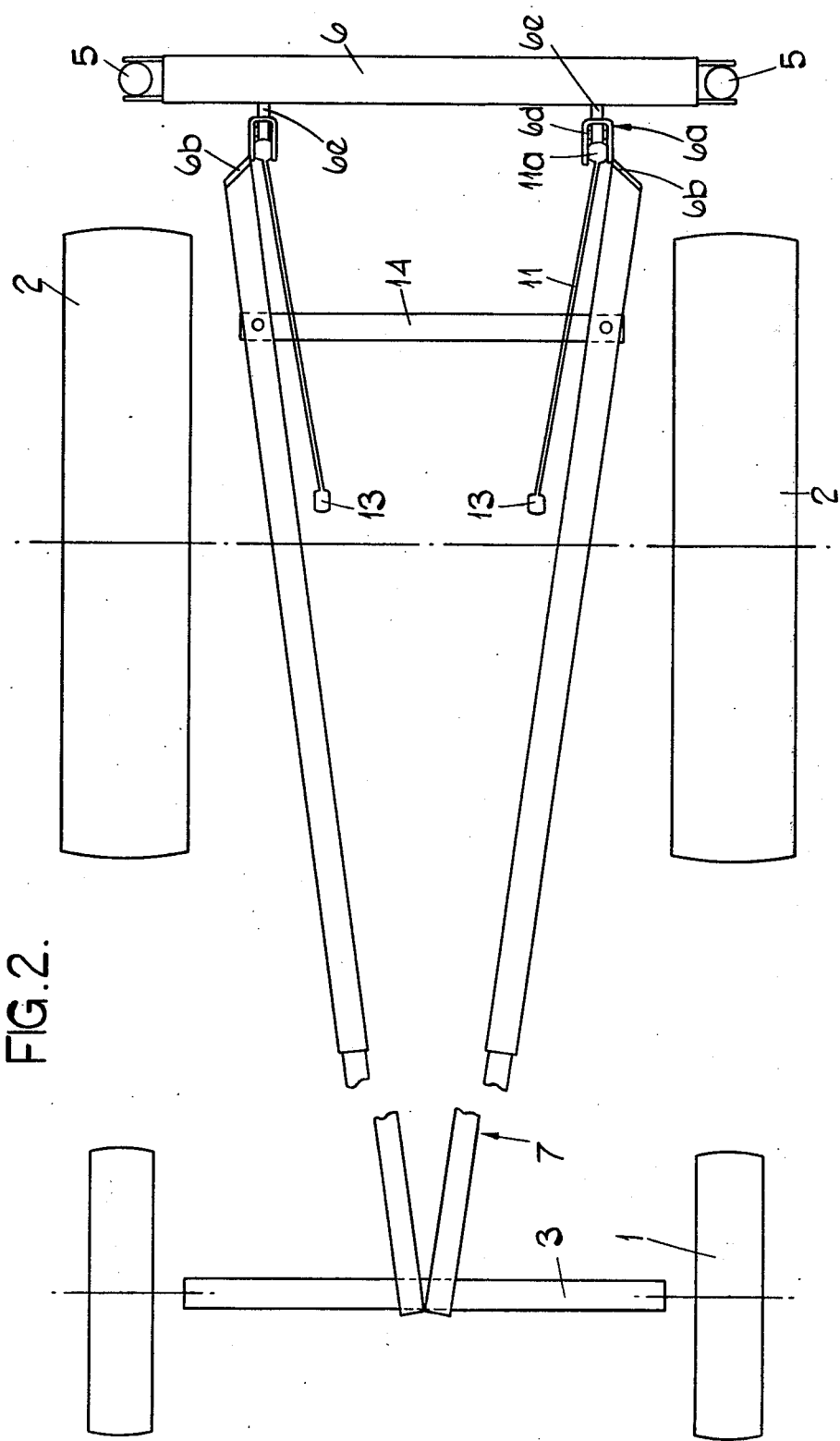
FIG. 2 is a plan view of the mechanism of FIG. 1.

Referring to FIG. 1 of the drawings, this shows the mechanism of the invention applied to a vehicle in the form of a tractor, of which the front and rear pairs of wheels are represented respectively at 1 and 2 and the front and rear axles respectively at 3 and 4.

The weight transfer mechanism includes a pair of lifting devices shown as hydraulic rams 5 secured at either end of a cross-member 6 of a machine (not shown) to be towed by the tractor. A pair of weight transfer members are provided in the form of beams 7 extending longitudinally of the tractor and converging towards their forward ends where they are supported by chain loops 8 slung over the front axle 3 so as to afford a degree of pivotal movement to the beams in a generally vertical plane. This arrangement is simple and readily adaptable to a variety of different shapes and sizes of vehicle, such adaptability being further increased by making each beam 7 in two telescopically interengaged parts 7a and 7b so that their lengths may readily be varied and locked in desired positions by inserting a pin 9 through a selected pair of a number of pairs of holes in known manner.

The beams 7 are secured to the cross-member 6 by means of brackets 6a. Each bracket has an outwardly projecting portion 6b secured as by welding, to an end of one of the beams 7, and a bifurcated depending portion 6c which forms a connection by means of a ball joint 6d with a lug 6e on the cross-member 6. A bifurcated upper portion of each bracket receives a further ball joint 11a forming a pivotal connection with a respective one of a pair of lower links 11 of a standard three-point linkage of the tractor, the upper link of which is represented at 12. The forward ends of the links 11 are pivotally connected to the tractor by ball joints 13 in known manner.

A cross-bar 14 underlying and spaced from the links 11 extends transversely of and interconnects the beams 7. Abutment pads or other adjustment means such as screws may be interposed between the intersecting portions of the beams and cross-bar, enabling the spacing between the cross-bar and links 11 to be adjusted for different thicknesses of link, depending upon the type of tractor to which the mechanism is fitted.

When it is desired to transfer the weight supported by the wheels 2 to the rams 5, which form supporting legs when extended, the rams are pressurised to exert a lift against the ground. The initial effect of this is to take up the spacing between the cross-bar 14 and links 11, whereupon the links and beams 7 are effectively locked together so that further lift exerted by the rams is applied via the links to the rear axle 4 of the tractor to raise the rear wheels off the ground and thus transfer a portion of the tractor weight to the rams 5.

This locking effect provides an important safety aspect in that once the beams 14 and links 11 come into engagement during lifting, the tractor and towed machine are effectively locked together and lifted as a unit and there is therefore no possibility of the machine tilting rearwardly towards the tractor with possible danger to the driver of the machine, as is the case with some conventional arrangements.

Figure 3:
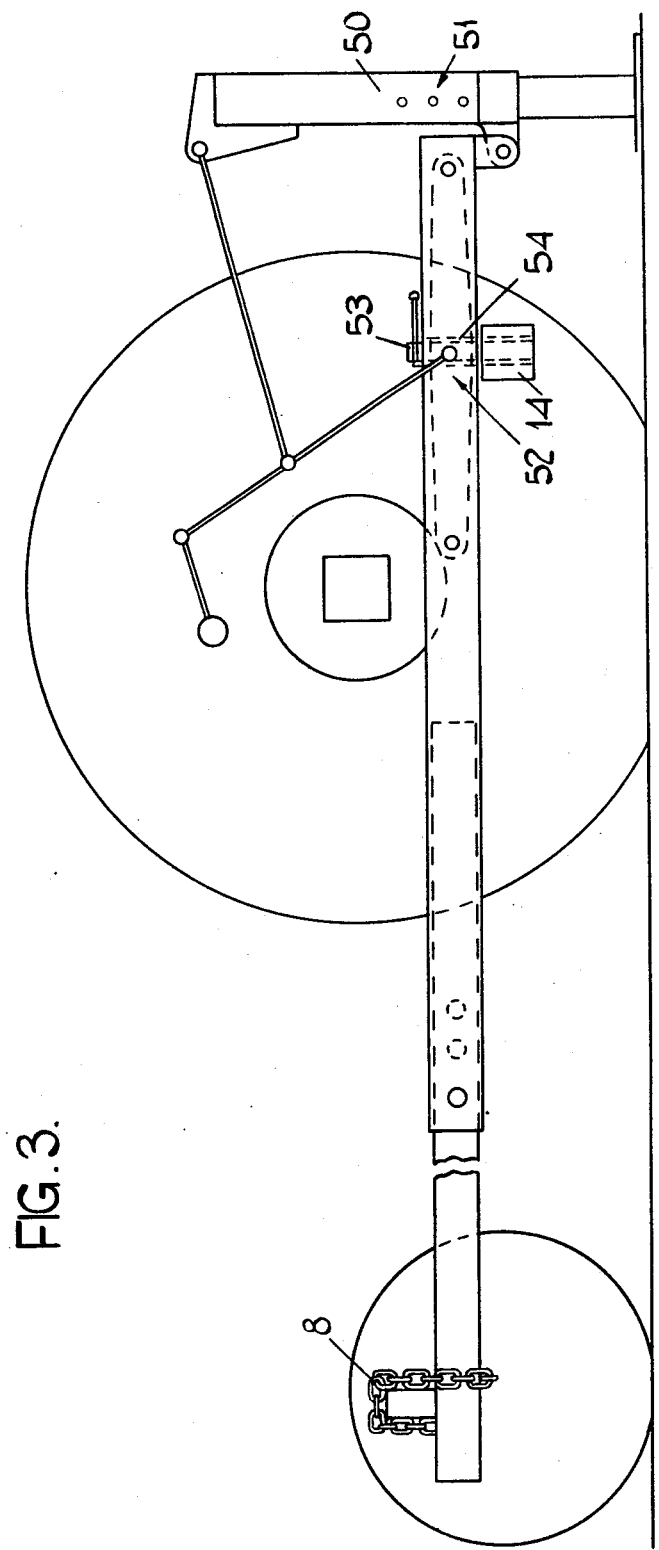
FIG. 3 is a side view of an alternative form of the mechanism of the invention.

FIG. 3 illustrates an alternative embodiment of the weight transfer mechanism of the invention in which the basic arrangement of beams 7 and links 11 is similar to that of FIG. 1, but in which the rams 5 are replaced by posts 50 of adjustable length. In this arrangement, lifting of the implement is effected by means of the tractor three-point linkage, which raises the legs, the length of which is adjusted as nearly as possible to bring them to rest on the ground. The leg adjustment means may conveniently be a pin and slot arrangement indicated at 51.

Lowering the implement by way of the three-point linkage to bring them onto the ground increases the clearance between the cross-bar 14 and links 11, and in order to enable this clearance to be taken up, means 52 are disposed between each of the beams 7 and the cross-bar 14. Such means may be of any convenient form, either mechanically or fluid-pressure operated, but as shown it consists of a bolt 53 screwed into a threaded bore in the cross-bar and rotatable in a sleeve 54 in the associated beam 7. When clearance has been taken up between the links 11 and cross-bar 14 by operation of the means 52, the cross-bar and beams are effectively locked together as before, providing the aforesaid safety feature.

A further alternative form of the mechanism of the invention is shown in FIG. 4, in which the cross-bar 14 is dispensed with and the beams 7 extend parallel to each other beneath the links 11 enabling lift to be exerted directly by the beams on the links. The rams 5 extend obliquely and generally transversely of the vehicle and are connected to the beams 7 by a rigid V-shaped bracket 15 and pivoted legs 16. The rear ends of the beams 7 are rigidly connected together for stability by a cross-member 17 and this assembly is also connected by pivot pins 10 and lugs 6a to the cross-beam 6 of a machine as before so that the machine is raised with the tractor when the rams 5 are extended. The tractor is raised when the beams 7 engage the links 11, as before, upon extension of the rams. The forward ends of the beams may be rigidly interconnected by a further cross-member 17a which, together with the beams 7 and member 17 form a rigid frame which may be fitted in one piece to a tractor/implement combination.

Means may also be provided for lifting the front end of the tractor and FIG. 4 shows one possible arrangement for this. The front cross-member 17a is connected by a bracket arrangement 18 to a single hydraulic ram-operated leg 19. It would alternatively be possible to use a pair of spaced rams acting on the ends of the beams 7, either directly or via cross-member 17a when present. When the forward ends of the beams are interconnected, the beam assembly may be slung from the front axle of the tractor by means of a single chain passing over the axle and attached to the respective beams.

It will be appreciated that, although it is preferred to use beams 7 of substantial length as shown, because this minimises the stroke of ram required to initiate lifting, it would nevertheless be possible to pivot the beams at a location on the tractor nearer to the rams. Instead of using twin beams 7, it may be possible to use a single preferably generally central beam with a transverse portion at its rear end for engagement with the cross links or one or more other abutments. It will be understood that means for lifting the forward end of the vehicle can be used with any form of the mechanism of the invention.

The lifting device may be constituted by a fluid-operated implement, such as the arm or bracket of a machine carried by the vehicle, the implement being arranged to contact the ground when desired in order to react the force derived from the fluid operation and thus lift the vehicle and machine. The aforesaid safety aspect becomes particularly advantageous in this case in preventing a vehicle operator from raising the machine independently of the vehicle and thus obviating possible danger to the machine operative.

The invention also embraces a machine or implement incorporating the weight transfer mechanism of the invention intended for coupling to a towing vehicle, as well as a combination of towing vehicle and machine to be towed incorporating a weight transfer mechanism.

We claim:

1. A weight transfer mechanism for a towing vehicle and a machine to be towed comprising a lifting device, a weight transfer member adapted to be coupled to the lifting device and to be supported for generally vertical pivotal movement with respect to the vehicle, first abutment means connected to said member, and second abutment means on the vehicle, the arrangement being such that with the machine connected to the member and said first and second abutment means in engagement to prevent relative lifting between the machine and the vehicle operation of said lifting device causes the machine and vehicle to be lifted together as a unit through the intermediary of said member.

2. A mechanism according to claim 1 and further comprising a three point linkage on the vehicle having lower generally horizontal links, at least one of which constitutes the second abutment means.

3. A mechanism according to claim 1 wherein a pair of said beams is provided and the beams converge towards the front of the vehicle.

4. A mechanism according to claim 3 wherein means are provided for effecting lengthwise adjustment of each beam.

5. A mechanism according to claim 1 and further comprising a three point linkage on the vehicle having lower generally horizontal links, at least one of which constitutes the second abutment means, the beams being spaced so as to be outside the lower links, and a cross-bar being provided to interconnect the beams and constitutes said first abutment means.

6. A mechanism according to claim 5 wherein means are carried by the beams for forming pivotal connections both with the lower links and with the machine.

7. A mechanism according to claim 7 wherein adjustable means are provided for taking up clearance between each first and second abutment means.

8. A mechanism according to claim 5 wherein the cross-bar is adjustable in length.

9. A mechanism according to claim 1 wherein a pair of substantially parallel beams are provided and connected by a pair of cross bars to form a rigid frame.

10. A mechanism according to claim 9 wherein a ram is provided on a forward one of the cross-bars for lifting the front wheels of the vehicle off the ground.

11. A mechanism according to claim 9 wherein respective rams extend obliquely and generally transversely of the vehicle and respective arms are provided forming pivotal connections with the rams and connecting the rams respectively to the beams.

* * * * *